United States Patent
Van Lunteren et al.

(10) Patent No.: US 9,959,202 B2
(45) Date of Patent: *May 1, 2018

(54) MEMORY AND PROCESSOR HIERARCHY TO IMPROVE POWER EFFICIENCY

(71) Applicant: International Business Machines Corporation, Armonk, NY (US)

(72) Inventors: Jan Van Lunteren, Rueschlikon (CH); Heiner Giefers, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/855,803

(22) Filed: Sep. 16, 2015

(65) Prior Publication Data
US 2016/0077577 A1 Mar. 17, 2016

(30) Foreign Application Priority Data
Sep. 16, 2014 (GB) .................................. 1416304.2

(51) Int. Cl.
*G06F 12/02* (2006.01)
*G06F 1/32* (2006.01)
(Continued)

(52) U.S. Cl.
CPC ............ *G06F 12/02* (2013.01); *G06F 1/3275* (2013.01); *G06F 9/265* (2013.01); *G06F 9/3004* (2013.01);
(Continued)

(58) Field of Classification Search
CPC .. G06F 1/3275; G06F 9/30007; G06F 9/3004; G06F 3/0673; G06F 3/0659;
(Continued)

(56) References Cited

U.S. PATENT DOCUMENTS 5,678,021 A  10/1997 Pawate et al.
6,097,403 A   8/2000 McMinn
(Continued)

OTHER PUBLICATIONS

Chien, A., et al., "10×10: A General-Purpose Architectural Approach to Heterogeneity and Energy Efficiency", Proceedings of the International Conference on Computational Science, Jun. 1-3, 2011, pp. 1-10.
(Continued)

*Primary Examiner* — Reginald Bragdon
*Assistant Examiner* — Mehdi Namazi
(74) *Attorney, Agent, or Firm* — Scott S. Dobson

(57) ABSTRACT

A computing memory includes an execution unit and an access processor coupled with a memory system, where the execution unit and the access processor are logically separated units. The execution unit is for processing operand data. The access processor is for providing operand data and configuration data to the execution unit. The access processor reads operand data from the memory system and sends the operand data to the execution unit. The execution unit executes the operand data according to the provided configuration data. The access processor includes information about execution times of operations of the execution unit for the provided configuration. The access processor reserves time-slots for writing execution unit results provided by the execution unit into selected locations in the memory system based on the information about the execution times, upon sending at least one of the operand data and the configuration data to the execution unit.

20 Claims, 6 Drawing Sheets

(51) Int. Cl.
*G06F 9/30* (2018.01)
*G06F 9/26* (2006.01)

(52) U.S. Cl.
CPC ...... *G06F 9/30007* (2013.01); *Y02B 60/1225* (2013.01); *Y02B 60/1228* (2013.01)

(58) Field of Classification Search
CPC ...... G06F 15/785; G06F 9/3857; G06F 9/265; G06F 12/02; G06F 12/0246; Y02B 60/1225; Y02B 60/1228
See application file for complete search history.

(56) References Cited

U.S. PATENT DOCUMENTS

| | | |
|---|---|---|
| 6,760,833 B1 | 7/2004 | Dowling |
| 8,588,555 B1 | 11/2013 | Felch et al. |
| 8,713,335 B2 | 4/2014 | Felch et al. |
| 2002/0040429 A1 | 4/2002 | Dowling |
| 2004/0193839 A1 | 9/2004 | Kirsch |
| 2010/0313000 A1 | 12/2010 | Walker |
| 2014/0149759 A1 | 5/2014 | Conrad et al. |

OTHER PUBLICATIONS

Koukos., K., et al. "Towards More Efficient Execution: A Decoupled Access-Execute Approach", Proceedings of the 27th International ACM Conference on International Conference of Supercomputing, Jun. 10-14, 2013, pp. 1-10.
Terzopoulos, G., et al., "Performance Evaluation of a Real-Time Grid System Using Power-Saving Capable Processors", The Journal of Supercomputing, Sep. 27, 2011, pp. 1-19.
United Kingdom Search Report dated Mar. 31, 2015, received for United Kingdom Application No. GB1416304.2.
Examination Report dated Mar. 16, 2016 received for United Kingdom application No. GB1416304.2.
IBM Response to Examination Report filed on Mar. 31, 2016 for United Kingdom application No. GB1416304.2.
Notification of Grant: Patent Serial No. GB2530261, United Kingdom Application No. GB1416304.2, dated Jul. 5, 2016, 2 pages.
Van Lunteren et al., "Memory and Processor Hierarchy to Improve Power Efficiency", U.S. Appl. No. 15/417,676, filed Jan. 27, 2017.
List of IBM Patents or Patent Applications Treated as Related, dated Jan. 24, 2017, pp. 1-2.
Van Lunteren et al., "Memory and Processor Hierarchy to Improve Power Efficiency", Application No. GB1416304.2, Filed Sep. 16, 2014. 29 pages.

MEMORY AND PROCESSOR HIERARCHY TO IMPROVE POWER EFFICIENCY

BACKGROUND

The invention relates generally to a computing memory. The invention relates further to a computing system.

In von-Neumann machines a central processor (CPU=central processing unit or GPU=graphics processing unit) employs several mechanisms to overcome the so called "Memory Wall", which is a term to denote the growing performance gap between ever faster processors and comparably slower memory technologies. These mechanisms are in particular focused on tolerating longer access latencies of the main memory system (with the latency expressed in processor cycles) in order to minimize the time that the processor's execution units are stalled, or in other words, to maximize the utilization of the execution unit(s).

One of the most important features of these mechanisms is the use of a memory hierarchy comprised of multiple levels of fast caches. Other mechanisms include support for out-of-order execution of instructions and multi-threading which both allow to continue processing with different instructions and/or threads when certain instructions or threads have been stalled while waiting for data to arrive from the memory system.

Another example of a mechanism to reduce the (average) access latency is a prefetching of data from the memory system.

The above-mentioned techniques were disclosed in a time when the processor and memory system designs were not limited by power. Furthermore, the focus was mainly at maximizing the execution pipeline utilization by reducing the memory access latency. As a result, these mechanisms are typically among the most power-hungry components of a computer system, also wasting a considerable amount of memory bandwidth. For example, if the processor only needs a single byte, still a complete cache line may be retrieved from the memory system from which the remaining bytes are not used. The same applies to the prefetching of data that is typically only partially processed, if at all. Both cases do not only waste memory bandwidth, but also waste power for unneeded data accesses and operations.

There are several disclosures related to an active memory device and related memory access.

U.S. Pat. No. 8,713,335 B2 discloses a parallel processing computing system which includes an ordered set of m memory banks and a processor core. The ordered set of m memory banks includes a first and a last memory bank, wherein m is an integer greater than 1. The processor core implements n virtual processors, a pipeline having p ordered stages, including a memory operation stage, and a virtual processor selector function.

Document US 2014/0149759 A1 discloses a process including multiple cores each to independently execute instructions and a power control unit (PCU) coupled to the cores to control power consumption of the processor. In turn, the PCU includes a controller logic to cause the processor to re-enter a first package low-power state responsive to expiration of an inter-arrival timer, where the expiration indicates that the time duration, subsequent to a transaction received in the processor, has occurred.

However, there may be a need to improve power efficiency of a processor/memory system. Furthermore, there may be a need to overcome the "Memory Wall" problem.

BRIEF SUMMARY

In one embodiment, a computing memory is disclosed. The computing memory comprises an execution unit for processing operand data, and an access processor coupled with a memory system for providing operand data and configuration data to the execution unit. The execution unit and the access processor are logically separated units. The access processor reads operand data from the memory system and sends the operand data to the execution unit, where the execution unit executes the operand data according to the provided configuration data. The access processor comprises information about execution times of operations of the execution unit for the provided configuration. The access processor reserves time-slots for writing execution unit results provided by the execution unit into selected locations in the memory system based on the information about the execution times, upon sending at least one of the operand data and the configuration data to the execution unit.

In another embodiment, a computing system is disclosed. The computing system comprises a central processing unit and a computing memory acting as a main memory for the central processing unit. The computing memory comprises an execution unit for processing operand data, and an access processor coupled with a memory system for providing operand data and configuration data to the execution unit. The execution unit and the access processor are logically separated units. The access processor reads operand data from the memory system and sends the operand data to the execution unit, where the execution unit executes the operand data according to the provided configuration data. The access processor comprises information about execution times of operations of the execution unit for the provided configuration. The access processor reserves time-slots for writing execution unit results provided by the execution unit into selected locations in the memory system based on the information about the execution times, upon sending at least one of the operand data and the configuration data to the execution unit.

In yet another embodiment, a method for operating a computing memory is disclosed. The method comprises reading, via an access processor, operand data from a memory system. The access processor provides the operand data and configuration data to an execution unit for processing the operand data, where the execution unit and the access processor being logically separated units. The execution unit executes the operand data according to the configuration data. The access processor comprises information about execution times of operations of the execution unit for the configuration data. The access processor reserves, upon providing the operand data and the configuration data to the execution unit, time-slots for writing execution unit results provided by the execution unit into selected locations in the memory system based on the information about the execution times.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
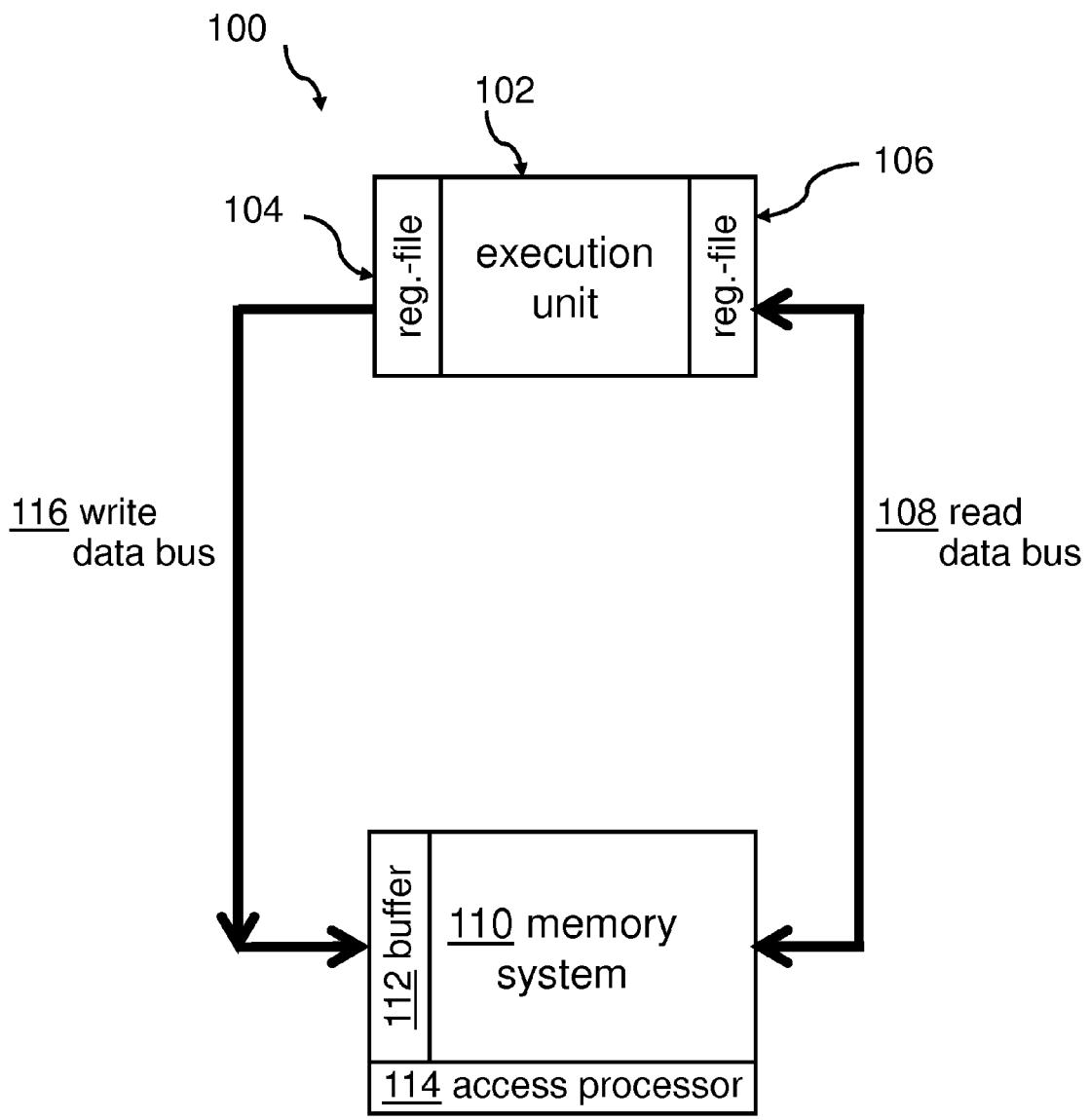
FIG. 1 shows a block diagram of an embodiment of a combination of a memory system and an execution unit according to the state-of-the-art.

It may be noted that the execution unit(s) may also be named execution processor(s). However, due to a required differentiation from a general purpose CPU and due to its tightly integration into the memory system, a denotation as execution unit seems to be more appropriate.

It may also be noted that the logically separated unit of the execution unit and the access processor may be on different chips or on the same die.

It may also be understood that if an operand may be mentioned, also a series of operands may be meant.

The selected locations may be memory cells or memory banks, depending on the organization of the memory system.

In the context of this description, the following conventions, terms and/or expressions may be used:

The term "computing memory" may denote a group of coupled calculation elements comprising at least a memory, an access processor and an execution unit. According to one aspect, the computing memory may be regarded as an intelligent memory system with integrated processing capabilities. It may not be intermixed with a general purpose processor. The computing memory, according to the present invention, may be coupled to a general purpose processor as a memory system with integrated processing capabilities which may offload computing requirements from the general purpose processor.

The term "execution unit"—in particular execution unit L1 and L2—may denote an execution pipeline with different stages and register files, in particular an input register file and an output register file. The different stages of the execution pipeline may be configurable in its dedicated function. Configuration data may be instrumental to define the functionality and computing capabilities of the execution pipeline. The execution unit, also denoted as L1 execution unit, may be tightly coupled to the access processor and the memory system; actually it may be part of the memory system.

There may also be other hierarchy levels of execution pipelines or execution units, like L0, L2 and L3. The execution unit L3 may be a central processing unit (CPU) or a graphics processing unit (GPU) which may—in contrast to execution units L0, L1, L2—both not be a part of the memory system. The other execution units L0, L1 and L2 may be implemented as part of the memory system and its existence may be transparent for the traditional CPU/GPU.

The term "operand data" may denote data that may be sent from a memory system to an execution unit of the inventive computing memory via a read data bus. The operand data may be received by the input register file of the execution unit. However, the operand data may also be configuration data for the execution unit. A differentiation between the different meanings of the operand data may be achieved by a tag associated to individual operand data.

The term "access processor" may denote a dedicated processor for address and execution time calculations. In contrast to a classical general purpose processor, the access processor may be tightly integrated with, and be part of, a memory system. The access processor may be optimized to access one or more of the memory banks, typically in an interleaved fashion, to maximize the memory bandwidth utilization. Data retrieved from those memory banks may then be transferred over to a read data bus to an input register file of the execution unit. The memory access—in form of read and later-on write—and the bus transfers may be scheduled in a combined fashion by the access processor. The access processor may be implemented using a fast programmable B-FSM (finite state machine).

The term "memory system" may denote, e.g., a main memory of a computing system which may be organized in memory banks. The memory system may comprise, e.g., DRAM memory cells. However, other technologies for storing individual bytes, e.g., SRAM or memristors, may also be possible. It may be noted that the access processor and the execution unit may be integrated with the memory system.

The term "configuration data" may denote data, in particular operand data, defining the functionality of the execution pipeline of the execution unit. The configuration data may be implemented as a horizontal micro-code vector for the setting of multiplexers defining the functionality of the execution pipeline. Different configuration data may result in different functionality of the execution unit.

The term "execution times of operations" may denote time required to perform specific but different operations by the execution unit. The individual execution time may be measured in processing cycles or another memory system internal clock cycle.

The term "field programmable gate array" (FPGA) may denote an integrated circuit designed to be configured by a system designer after manufacturing—hence "field-programmable". The FPGA configuration is generally specified using a hardware description language (HDL) and may have large resources of logic gates and RAM blocks to implement complex digital computations.

The term "tag" may denote a bit sequence, e.g., six bits long, defining the meaning of operand data. A tag for operand data may, e.g., define that specific operand data are data to be processed by the execution unit or alternatively used as configuration data to define the functionality of the execution unit.

The term "three-dimensional chip" (3D chip) may denote an integrated circuit comprising different active electronic layers on top of each other which are electrically isolated against each other. Today, typical integrated circuits are implemented in a two dimensional topology. However, 3D chips are technically feasible. One embodiment of the here disclosed computing memory may implement memory banks in one layer of a 3D chip and the access processor and/or execution unit(s) may be implemented in a different layer of the 3D chip.

It may also be mentioned that the terms "input register", "input register file", and "input buffer" may be used in an interchangeable fashion? The same applies for the terms "output register", "output register file" and "output buffer".

The proposed computing memory may offer a couple of advantages:

The execution unit L1—and potentially a separate execution unit L0 (see below)—may be located physically very close to and/or inside the memory system. Data that may be processed using the execution unit L1 processor—or optionally the execution unit L0—have to be transferred over a much shorter distance compared to a traditional processor/ memory architecture with a much more loosely coupled execution units, e.g. execution unit L2 or oven the CPU L3 (see below).

Furthermore, because the L1—and potentially the L0—execution units are scheduled directly by the access processor together with the read accesses to retrieve the operands and the write accesses to store the execution results, no explicit testing for the availability of operand values may be needed and no output buffering of the execution results is required, as it may be the case with the execution unit L2. This may result in a substantial reduction in power consumption compared to the case in which all data have to be processed by the more loosely coupled execution unit L2. Thus, total power consumption of the integrated processor/memory system may go down while at the same time the overall processing speed may be increased.

This advantage is a result of integrating and treating the execution unit as part of the memory system and not as a separate CPU. Nevertheless, a CPU may be coupled to the inventive computing memory. In such a case, the execution unit L1 may be dedicated to specific tasks and computations—e.g., highly repetitive matrix or other repetitive operations—while the CPU—or also the execution L2—may process other, more general and statistically more diverse, tasks. In such a scenario, the CPU would treat the memory system/execution unit couple as THE main memory. The existence of the execution unit L1 and L2 (and even L0) may not be transparent to the CPU. The split of tasks between the execution unit(s), as part of the memory system and the CPU, may be managed by a compiler. Such a compiler may generate the respective machine level commands either for the CPU or the memory system, in particular the integrated execution units.

It may be noted that according to the proposed architecture, the prime responsibility for the sequence of instructions in this memory accesses is moved from the general purpose processor to the access processor of the memory system. Because of its knowledge about execution times for specific commands of the execution unit and much tighter link between the execution unit and the memory system is possible. In a certain sense, the processing capability is moved much closer to the place where data are stored compared to a traditional architecture.

Hence, the access processor is deeply integrated into the memory system and exposed to full memory details like cycle times, bank organization and retention times; basic operations of the memory system are made programmable like access scheduling, address mapping, page open/close commands; and flexible address mapping in combination with address generation functions enable efficient interleaving over memory banks and memory lines. Thus, a fine-grain adaption of the data structures organization/mapping and memory operation to the access behavior of the workload is enabled.

It may also be noted that due to the configuration of the execution unit L1 and because the access processor schedules memory accesses, data transfer and access to the register file/input buffer in a combined fashion, no instruction fetching and decoding may be required. The access processor pre-calculates addresses for writing results obtained from the execution pipeline directly. And, the availability of all operand data/operand values in the input buffer/register file of an execution unit or execution pipeline may trigger execution of the operation in a dataflow-like manner.

Consequently, data processing is moving closer to the memory instead of a strict separation of a traditional CPU and a traditional memory system. This allows also an adaption of the operation of the memory system to the application. Instead of the CPU, the access processor of the memory system becomes the master of the operation.

The proposed architecture may be implemented in situations in which calculations performed by the execution unit may be highly repetitive, like, e.g., in Fast Fourier Transformation (FFT) calculations. This type of calculations are based on repetitive add/multiply operations, as they are typical in matrix multiplications.

Under another point of view, the solution of the problems may be achieved by applying a kind of "data-push approach" in which the memory system actively selects the data and initiates the transfer of that data to the execution unit, versus the traditional kind of "data-pull approach" typically applied by prior-art computer systems in which the processor, comprising one or multiple execution units, actively has to select and request data to be transferred from the memory system to those execution units.

According to one embodiment of the computing memory, the execution unit may be implemented as field programmable gate array (FPGA). This may allow for flexibility in the production process and may allow easy configurability of the elements of the computing memory, namely the access processor and the execution unit including its pipeline structure.

According to a further embodiment of the computing memory, the information about execution times of operations of the execution unit for a provided configuration may be pre-calculated, pre-programmed or measured. Thus, it may always be known which configuration of the execution unit L1 may need which execution times for specific operations. Thus, it may always be determined upfront how long an operation using a specific configuration of the execution unit may need from the beginning of a command until the end.

The known execution times may be stored as part of the access processor. The execution times may be pre-calculated "on-the-fly" during the execution of the access processor, they may be pre-programmed and stored in a memory of the access processor or they may have been measured, e.g., by the access processor and subsequently be stored.

Knowing the execution times of specific commands related to a specific configuration of the execution unit may allow predicting an exact machine cycle when a command of the execution unit may be finalized. The access processor may use this knowledge to reserve time-slots to store the result of the access processor in the memory system. No additional buffering between the execution unit and the memory system may be required. This may reduce the number of required latches, and thus reduce complexity and power consumption.

According to an enhanced embodiment of the computing memory, the access processor also provides a tag together with each operand and each configuration of the operand and configuration data. Such a tag may be of fixed length measured in a number of bits, e.g., six bits. However, any other suitable number of bits may be reserved for such a tag. Such a tag may be used by the execution unit to interpret the data received by the access processor. The data may be, e.g., one or more operands for an execution or the data may, e.g., be configuration data for a configuration of the pipeline of the execution unit.

Accordingly and corresponding to an embodiment of the computing memory, the tag may define the type of data sent from the access processor to the execution unit. As discussed above, there may be no misinterpretation about the data received by the execution unit from the access processor. No other intrinsic assumptions have to be made about the meaning of an operand. This may enhance the reliability of the integrated execution unit/memory system architecture.

According to a further enhanced embodiment of the computing memory, the type of data may define at least one out of the group comprising operand data, execution unit configuration data or information about future use of operand data. Hence—as already mentioned above—the tag defines clearly how received data have to be treated. Data sent from the access processor to the execution unit may either be a real operand for an execution within the pipeline according to the configuration of the execution unit. On the other side, the data may redefine the configuration of the execution unit and thus, its function and its calculation characteristics for regular operands.

The tag may also indicate how to treat operand data of the execution unit. The tag may, e.g., define that operand data of a computation of the execution unit may be needed and thus kept for a future operation of the execution unit.

According to a specific embodiment of the processing system, configuration data may comprise a horizontal microcode vector. The elements of the micro-code vector may be used as settings or set up values of multiplexers for the pipeline of the execution unit. Thus, the functionality of the execution unit may be configured in a fully flexible way, only fenced by the total capabilities of the underlying processing pipeline of the execution unit.

According to one embodiment of the processing system, the configuration data may comprise a micro-program to be executed in the execution unit. As an alternative to the micro-code vector as configuration data for the execution unit, the micro-program may allow even more flexibility in terms of the functionality of the computing pipeline of the execution unit. More complex and time-dependent configurations may be transmitted from the access processor to the execution unit. In the figurative sense, such a micro-program may define the operation sequence for the execution pipeline of the execution unit.

According to an advantageous embodiment of the computing memory, the access processor and the memory system may be implemented in a three-dimensional (3D-) chip. The access unit and the execution unit—the logic layer so to speak—may be implemented in one layer of the 3D-chip and the memory system may be implemented in another layer. However, the access unit may also be implemented on the same layer as the memory system, e.g., eDRAM (embedded dynamic random access memory). One or more execution units may be implemented on the same layer as the access processor and one or more execution units may be implemented on another layer.

According to an alternative advantageous embodiment of the processing, the access processor and/or one or multiple execution units may be implemented on the same layer as the memory system. This alternative may allow other implementation options and a reduction of required layers for an easier fabrication process.

It may also be possible to stack separate such logic/memory sandwich constructions on top of each other, each sandwich layer being isolated from the next sandwich layer by a dielectric layer.

According to a more sophisticated embodiment of the computing memory, a second execution unit—e.g., an execution unit L2—may be coupled to the access processor. Such a second execution unit L2 may be coupled more loosely to the access processor than the first execution unit.

More loosely coupled may denote here that the access unit may have no or little information about execution times of the second execution unit for specific commands. Thus, the access processor may not be able to pre-calculate when a specific command may be finished by the second execution unit L2 and consequently may not reserve time-slots for writing execution unit results provided by the second execution unit directly into the memory system without a buffer in the input side of the memory system.

Hence, a specific interface at the memory system for receiving calculation results of the second execution unit may be required. Such an interface may be implemented as an input buffer on the memory system side.

The access processor may check periodically if execution results are available in the buffer and may then write them into the memory system either when a time-slot becomes available, i.e., the time-slot is not used for reading operand or configuration data by the access processor, or according to a priority scheme that may determine the order in which execution results are written and operand or configuration data is read by the access processor.

According to an even more advanced embodiment of the computing memory, the computing memory may comprise more than one execution unit. This may enhance the processing speed even more. Different execution units of the same level may operate on different data in parallel. The control for such parallel execution units as part of the memory system may be with the access processor. Different execution units may work together with, and be dedicated to, different memory regions or memory banks. In case an execution unit of the several execution units working in parallel may be idle, it may be powered down. This may enhance the power efficiency of the execution unit/memory system combination. Thus, only the execution units in use may be supplied with power.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of a known combination of a memory system and an execution unit device is given. Afterwards, embodiments of the inventive computing memory will be described.

FIG. 1 shows a block diagram 100 of an embodiment of a memory system 110 in combination with the input buffer 112 and an access processor 114 which may be coupled to a read data bus 108 and a write data bus 116 to an execution unit 102 according to the state-of-the-art. The execution unit may comprise an input register file 106 and an output register file 104. The input buffer 112 is required because the access processor 114 according to the state-of-the-art has no information about the time when the execution unit 102 will present its calculation result at the output register file 104 for a transmission via the write data bus 116 to the memory system 110. Thus, to synchronize the timing of the execution unit 104 in the memory system 110, a buffering of the results of the execution unit 102 in the input data buffer 112 may be required. It may be noted that the execution unit may start execution of operand data available in the input register file 106 once the operand data are available. The functionality of the execution unit may be adaptable using configuration data.

It may be noted that this execution unit/memory system may not be intermixed with a traditional CPU/memory system combination. The CPU is not shown here. It may be connected to the execution unit/memory system 100 and may regard the execution unit/memory system 100 as the main memory system.

Figure 2:
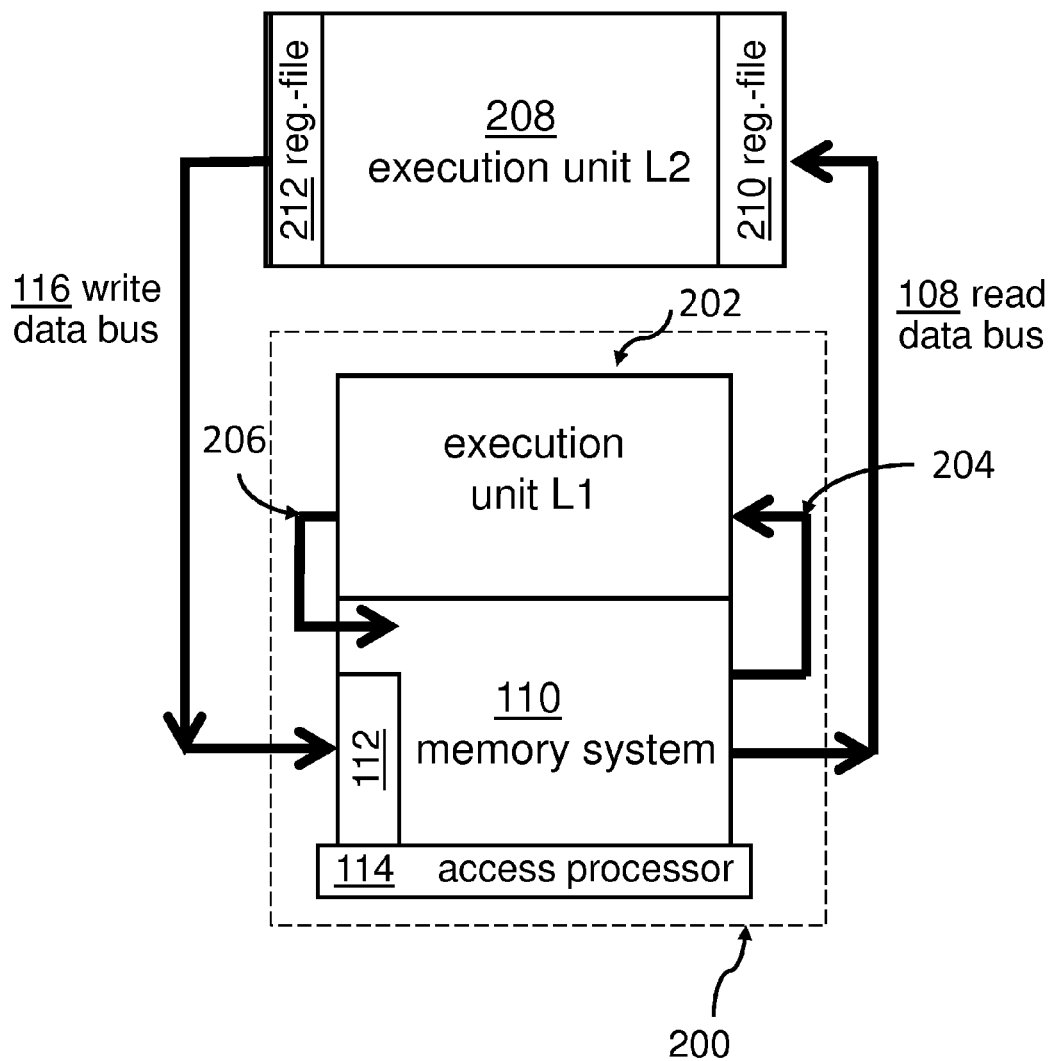
FIG. 2 shows a block diagram of an embodiment of the inventive combination of an execution unit L1 and the memory system as well as an execution unit L2.

FIG. 2 shows a block diagram of an embodiment of the inventive combination 200 of an execution unit L1 and the memory system, as well as an execution unit L2. This computing memory differentiates itself by a series of features if compared to the architecture according to FIG. 1. Firstly, two different execution units, namely execution unit L1 202 and execution unit L2 208, are shown. Both execution units 202, 208 are linked to the memory system 110 via read data bus 108. However, data from the memory system 110 are transferred to the execution unit L1 202 via the integrated data path 204. Execution unit L2 208 provides its calculation results via output register file 212 and write data bus 116 to input buffer 112 of memory system 110.

However, the execution unit L1 202 transmits its calculation results from the execution pipeline of execution unit L1 202 directly into a target addresses of the memory system 110 without going through the input buffer 112 of the memory system 110.

This is possible because the access processor 114 is aware of execution times of operations of the execution unit L1 for dedicated operations.

It may be noted that the execution unit 102 of FIG. 1 may now be denoted as execution unit L2 208. Execution unit L1 202 has been added to the architecture. Execution unit L1 202 may implement more simple operations, typically with constant or very predictable execution cycle counts. Execution unit L1 202 may consist of a set of execution pipelines and no instructions are fetched. Execution unit L1 202 does not have any logic to determine if certain combinations of input operand values are available, but it is directly scheduled by the access processor. The output data may be written directly into the input data buffer 112 of the memory system 110. However, it may alternatively write directly into the banks of the memory system 110. In the latter case, the access processor 114 may schedule the entire path from reading data from a memory bank, placing it into the execution pipeline of the execution unit L1 202, and writing the output data of the execution pipeline of execution unit L1 202 directly into the banks of the memory system 110 again. No buffer 212 may be required, as it is the case for execution unit L2 208.

It may be noted that the execution unit L2 208 may—in contrast to the execution unit L1 202—implement more complex operations in its execution pipeline. Exact timing of the availability of computational results of the execution unit L2 208 may not be predictable in the same way it may be possible for the execution unit L1 202. Thus, execution unit L2 208 may also comprise a fetch unit for fetching data from the memory system 110. Accordingly, output data of the execution unit L2 208 may be written to the memory system 110 via write data bus 116 and input buffer 112.

In contrast to this, execution unit L1 202 may deliver its results wire data path 206 directly into the memory banks of the memory system 110 without the use of the input buffer 212.

Hence, an execution unit hierarchy is implemented as part of the memory system. It may be noted, that the execution unit L2 208 may not be intermixed with a general purpose processor outside the memory system (see also FIG. 6).

Figure 3:
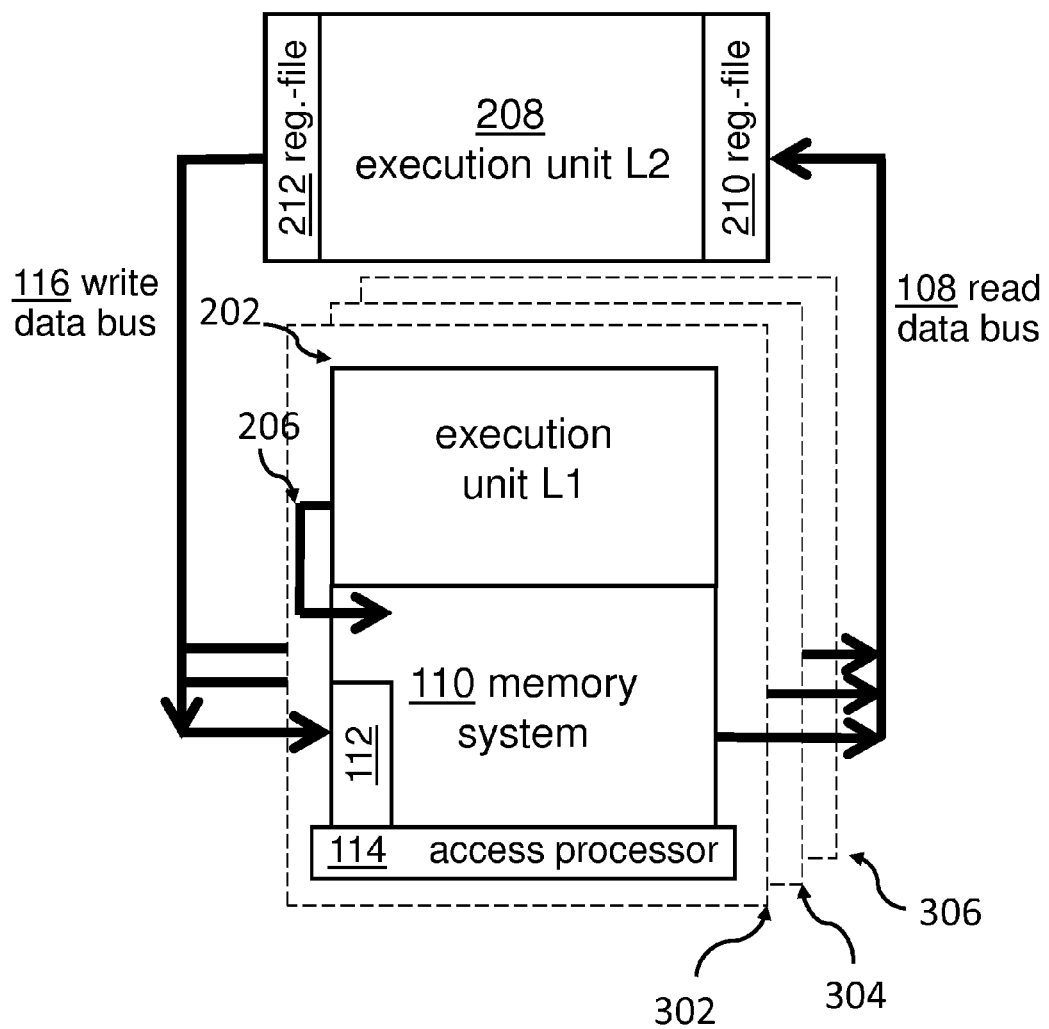
FIG. 3 shows a block diagram of an enhanced embodiment of a combination of a plurality of execution units L1 and the memory system.

FIG. 3 shows a block diagram of an enhanced embodiment of the disclosed computing memory. A series of tightly integrated execution units L1 202, memory systems 110 and access processors 114 are used and denoted as 302, 304, 306. All of these memories/execution unit layers may also feed execution unit L2 206 with operational data to its input register file 210 via read data bus 108. However, execution unit(s) L1 202 of the different layers may transfer its calculation results directly into the related memory system 110 without the use of the respective input buffer 112.—It may be noted that the data path from the respected execution unit L1 202 directly into the respective memory system 110 is not shown in FIG. 3.

This configuration may be advantageous in case the memory cells may be clocked at relative high speed—e.g., with 500 MHz—while the execution units are only clocked with, e.g., 125 MHz, due to power efficient reasons. In this case, multiple execution units may be attached to the memory system. When multiple execution units at a given level are identical, then the access processor may simply distribute the processing load over them using, e.g., a round robin scheme. Execution units L1 202 not in use may be powered down.

Figure 4:
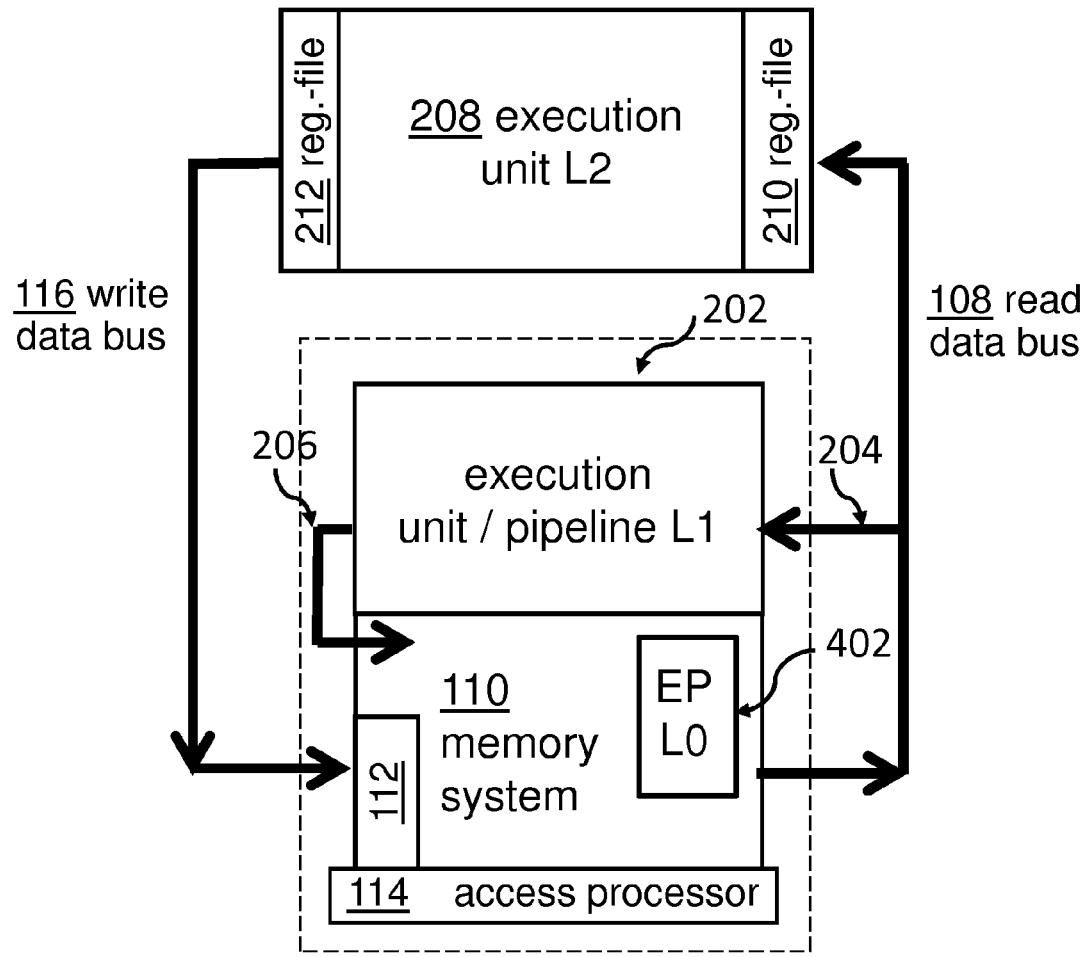
FIG. 4 shows an embodiment of an even more enhanced embodiment of a combination of an execution unit L1.

FIG. 4 shows a block diagram of an even more enhanced embodiment of the disclosed architecture. Here, an additional "layer" of an execution unit, namely execution unit L0 402, may be integrated directly into the memory system 110 by implementing it as a table or tables that may be stored in one or more of the memory banks.

There may be two versions of the execution unit L0 402. The first version may involve a table comprising pre-calculated results of all, or a subset, of the operand values. The result for a given set of operand values may then be obtained by performing a look-up to the table, typically using a hash function, although for small operand vector widths a direct lookup may be performed using the operand values as index into the table. Similar as with the execution unit L0, the access processor 114 may schedule the read accesses to retrieve the operand values, the write accesses for performing the table look-up, and to write access for storing the results.

A second version of this concept may involve storing the results for selected operand values in a dynamic fashion similar as with the cache memory. This version may be used efficiently for cases in which the number of different operand values that are used during a given time frame may be relatively smaller (a kind of temporal locality of reference). After the results for a given set of operand values has been calculated using execution unit L1 202 or execution unit L2 208, it may be inserted dynamically into the table (just like a normal cache operation), after which the result may be determined directly using a table look-up when the same set of operand values may be used in a subsequent calculation. Whether a result may be available for a given combination of operand values, it may be determined by storing information regarding the operand values inside the table and testing these against the new operand values similar to the checking of a cache tag. If no result is available, then the access processor 114 may send the data to the execution unit L1 202 or L2 208. Many cache features, such as an associativity/direct-mapped, a replacement policy, etc., may be applied here in more or less the same way.

Figure 5:
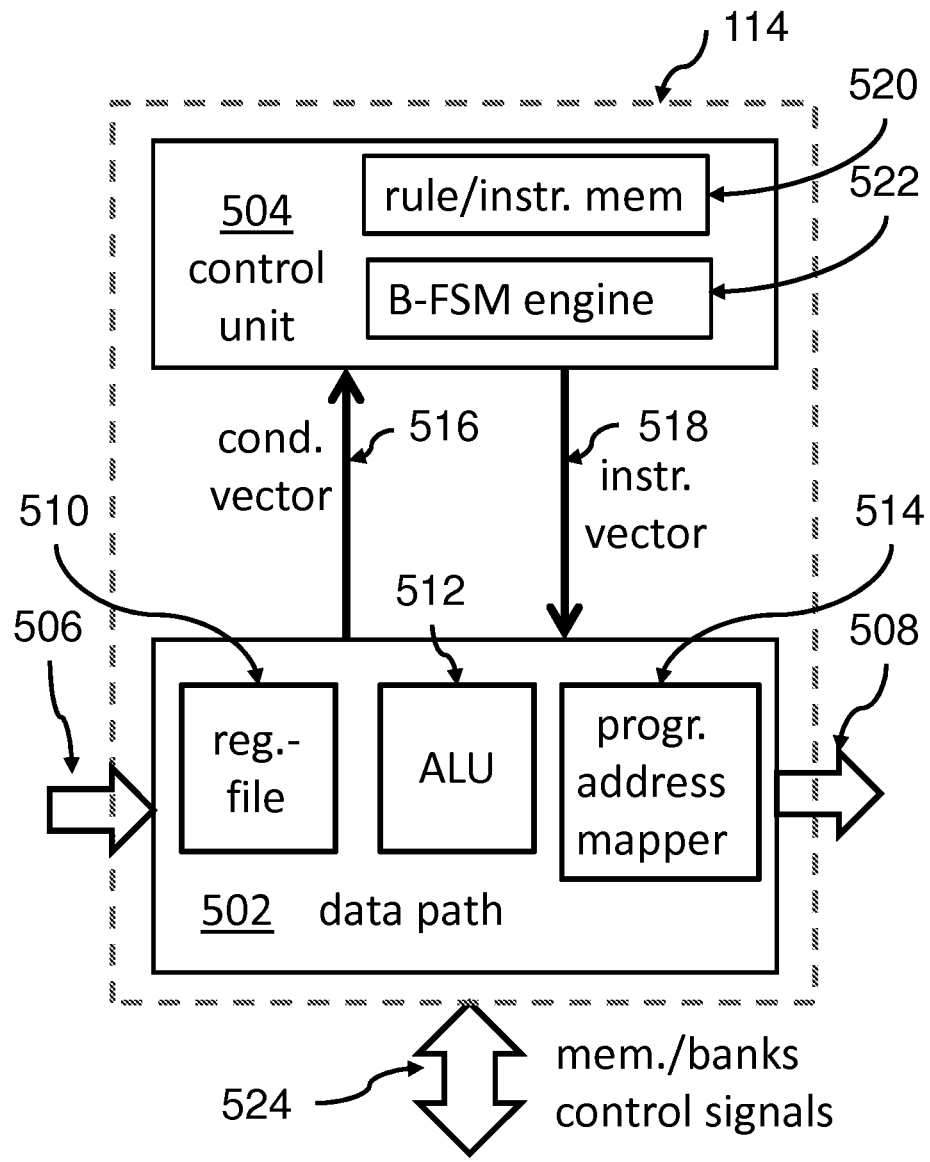
FIG. 5 shows a block diagram of an embodiment of the access processor.

FIG. 5 shows a block diagram of an embodiment of the access processor 114. The access processor 114 may be organized into major blocks: a data path 502 and a control unit 504. The data path 502 receives bus inputs like tags and option flags, as well as direct bus data from the write data bus 116 (see FIG. 1), compare arrow 506. Arrow 508 is a symbol for a connection of the data path 502 of the access processor 114 to bus control signals like tags and option flags, as well as a direct bus access for data output (compare e.g., read data bus 118, FIG. 1). The data path unit 502 comprises a register file 510, an arithmetic logical unit (ALU) 512 and a programmable address mapper 514. A condition vector 516 may provide status information of the data path to the control unit 502. The instruction vector 518 may be delivered back from the control unit 504 to the data path unit 502. The control unit 504 may comprise a B-FSM engine (finite state machine) 522 and a rule and instruction memory 520.

Access to the memory cells of memory system 110 may be performed via the data path 524 which may comprise signal lines for the data path, as well as control signals.

It may be noted that the access processor 114—implemented using a fast programmable state machine 522—may enable testing of many conditions in parallel: e.g., loop conditions (for counters) data arrival, etc. And, it may react very fast: for example it may dispatch instructions within one or two clock cycles.

Figure 6:
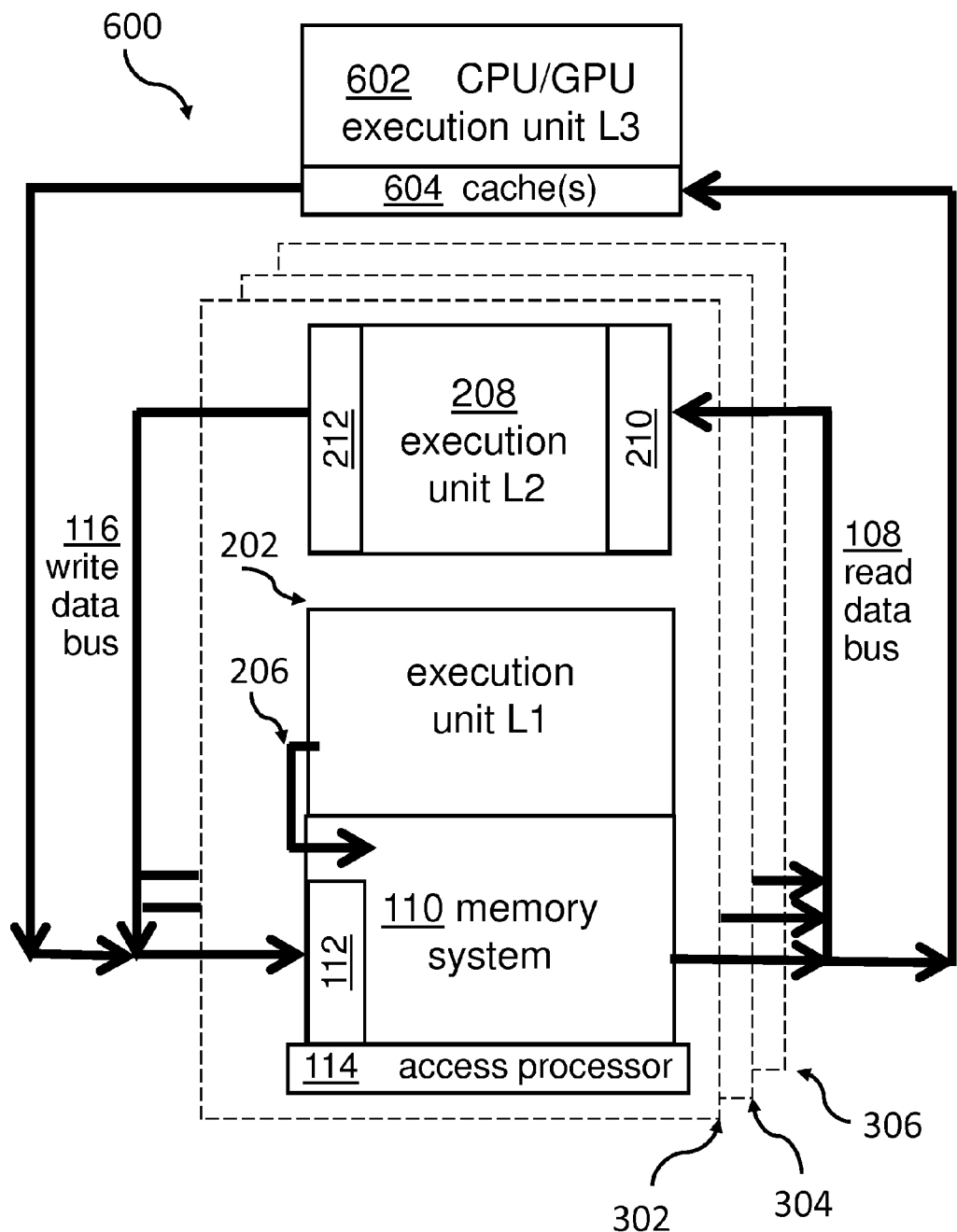
FIG. 6 shows a block diagram of an architecture comprising a CPU and the integrated execution unit/memory system.

FIG. 6 shows a block diagram of an even more extended architecture of a computing system 600 including a CPU 602. The CPU 602 may be a traditional central processing unit 602 or a traditional graphics processing unit. Both may comprise a cache memory 604 closely coupled to the CPU/GPU 602. The CPU/GPU 602 may operate with the modified memory system, comprising different execution units like the tightly coupled execution units L1 202 (of the different layers) and the loosely coupled execution units L2 208 (also of the different layers), an access processor 114, as when it were a traditional memory system without all the additional components. Thus, no modifications may be required for the CPU/GPU 602. Only the memory system— and a compiler—requires modifications. Hence, for the CPU/GPU 602 the modification of the new memory system may be transparent.

It may also be mentioned that the cache 604 may comprise a traditional level 1 (L1) and/or level 2 (L2) cache per processor core as well as a shared level 3 (l3) cache memory (not shown). The cache/CPU 604/602 combination may use a memory controller to access the main memory in which the inventive computing memory may be integrated comprising execution units L0 to L2 implementing a near-memory acceleration.

It may be noted that also in the embodiment of FIG. 6 an L0 execution pipeline 402—as discussed in the context of FIG. 4—may also be present. Thus—with or without the execution pipeline L0 402—there is a dedicated execution unit hierarchy for better use of resources and for power efficiency. It may be noted that the CPU/GPU 602 may be named execution unit L3 for consistency reasons.

While the invention has been described with respect to a limited number of embodiments, those skilled in the art, having benefit of this disclosure, will appreciate that other embodiments may be devised, which do not depart from the scope of the invention, as disclosed herein. Also, elements described in association with different embodiments may be combined. It should also be noted that reference signs in the claims should not be construed as limiting elements.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A computing memory, comprising:
an execution unit for processing operand data; and
an access processor coupled with a memory system for providing operand and configuration data to the execution unit, wherein the execution unit and the access processor are logically separated units, and wherein the access processor reads operand data from the memory system and sends these data to the execution unit which executes operations on the operand data according to the provided configuration data, and wherein the access processor has information about execution times of operations of the execution unit for the provided configuration, and wherein the access processor reserves time-slots for writing execution unit results provided by the execution unit into selected locations in the memory system based on the information about the execution times, at the time of sending the data to the execution unit.

2. The computing memory according to claim 1, wherein the execution unit is implemented as field programmable gate array.

3. The computing memory according to claim 1, wherein the information about execution times of operations of the execution unit for a provided configuration is pre-calculated, pre-programmed or measured.

4. The computing memory according to claim 1, wherein the access processor also provides a tag together with each operand and each configuration of the operand and configuration data.

5. The computing memory according to claim 4, wherein the tag defines the type of data sent from the access processor to the execution unit.

6. The computing memory according to claim 5, wherein the type of data defines at least one out of the group comprising operand data, execution configuration data or information about future use of operand data.

7. The computing memory according to claim 1, wherein configuration data comprise a horizontal micro-code vector.

8. The computing memory according to claim 1, wherein configuration data comprise a micro-program to be executed in the execution unit.

9. The computing memory according to claim 1, wherein the access processor and the memory system are implemented in a three-dimensional chip with the access processor and the execution unit implemented in one layer and the memory system implemented in another layer.

10. The computing memory according to claim 1, wherein the access processor and one or multiple execution units are implemented on the same layer as the memory system.

11. The computing memory according to claim 1, wherein a second execution unit is more loosely coupled to the access processor than the first execution unit.

12. The computing memory according to claim 1, wherein the computing memory comprises more than one execution unit.

13. The computing memory according to claim 12, wherein only the execution unit in use is supplied with power.

14. A computing system, comprising:
   a central processing unit; and
   a computing memory acting as main memory for the central processing unit, the computer memory comprising:
      an execution unit for processing operand data; and
      an access processor coupled with a memory system for providing operand and configuration data to the execution unit, wherein the execution unit and the access processor are logically separated units, and wherein the access processor reads operand data from the memory system and sends these data to the execution unit which executes operations on the operand data according to the provided configuration data, and wherein the access processor has information about execution times of operations of the execution unit for the provided configuration, and wherein the access processor reserves time-slots for writing execution unit results provided by the execution unit into selected locations in the memory system based on the information about the execution times, at the time of sending the data to the execution unit.

15. The computing system according to claim 14, wherein the execution unit is implemented as field programmable gate array.

16. The computing system according to claim 14, wherein the information about execution times of operations of the execution unit for a provided configuration is pre-calculated, pre-programmed or measured.

17. The computing system according to claim 14, wherein the access processor also provides a tag together with each operand and each configuration of the operand and configuration data.

18. The computing system according to claim 17, wherein the tag defines the type of data sent from the access processor to the execution unit.

19. The computing system according to claim 18, wherein the type of data defines at least one out of the group comprising operand data, execution configuration data or information about future use of operand data.

20. The computing system according to claim 14, wherein configuration data comprise a horizontal micro-code vector.

* * * * *